US009759891B2

United States Patent
Cai

(10) Patent No.: US 9,759,891 B2
(45) Date of Patent: Sep. 12, 2017

(54) WIDE ANGLE LENS

(71) Applicant: CALIN TECHNOLOGY CO., LTD., Taichung (TW)

(72) Inventor: Yuan-Long Cai, Taipei (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 14/956,113

(22) Filed: Dec. 1, 2015

(65) Prior Publication Data
US 2017/0153418 A1 Jun. 1, 2017

(51) Int. Cl.
*G02B 3/02* (2006.01)
*G02B 21/02* (2006.01)
*G02B 13/04* (2006.01)
*G02B 9/62* (2006.01)
*G02B 13/00* (2006.01)
*G02B 27/00* (2006.01)

(52) U.S. Cl.
CPC ............ *G02B 13/0045* (2013.01); *G02B 9/62* (2013.01); *G02B 13/006* (2013.01); *G02B 27/0025* (2013.01); *G02B 27/0075* (2013.01)

(58) Field of Classification Search
CPC ........ G02B 13/18; G02B 21/02; G02B 13/04; G02B 9/64; G02B 13/00; G02B 9/62

USPC ........ 359/713, 657–658, 750–752, 755–756, 359/761–762
See application file for complete search history.

(56) References Cited

U.S. PATENT DOCUMENTS

2008/0074761 A1* 3/2008 Yamakawa ............ G02B 13/04 359/794
2015/0309289 A1* 10/2015 Nakamura ......... A61B 1/00096 359/740

* cited by examiner

*Primary Examiner* — Dawayne A Pinkney
(74) *Attorney, Agent, or Firm* — Ming Chow; Sinorica, LLC

(57) ABSTRACT

A wide angle lens includes, in order from an object side to an image side along an optical axis, a negative first lens, a negative second lens, a positive third lens, a positive fourth lens, a negative fifth lens, and a positive sixth lens, wherein the sixth lens is adhered to the fifth lens to form a doublet lens. In addition, the wide angle lens further satisfies the condition of SD2/R2>0.6, where SD2 is half of an effective aperture of a surface of the first lens which faces the image side, and R2 is a radius of curvature of the surface of the first lens which faces the image side. Whereby, the FOV of the wide angle lens can be greater than 140 degrees, and the wide angle lens is compatible with a large-sized, e.g., 1/2.3", photosensitive component.

11 Claims, 4 Drawing Sheets

WIDE ANGLE LENS

BACKGROUND OF THE INVENTION

1. Technical Field

The present invention relates generally to an optical lens, and more particularly to a wide angle lens.

2. Description of Related Art

In recent years, optical lenses are going with the trend of miniaturization and lightweight to be better applied into car electronics, sports video cameras, portable devices, and surveillance cameras. While the size of optical lenses are becoming smaller and smaller, end users still demand optical lenses to provide a larger field of view (FOV), which makes it possible to capture wider images.

However, if the angle of view of a lens is greater than 90 degrees, images tend to be distorted. In addition, a commonly seen wide angle lens usually adopts a photosensitive component of 1/3" or 1/2.7", and the mainstream specification of a sports video camera requires a ten megapixel photosensitive component of 1/2.3". Therefore, in order to overcome the problem of image distortion and aberration which may happen on a lens having a photosensitive component of 1/2.3", such a lens has to include more lenses for compensation, but the thickness of the lens would be thickened as a result, which contradicts the trend of miniaturization. Yet, technically speaking, the required performance would be very unlikely to achieve with fewer lenses or shorter length of the wide angle lens.

BRIEF SUMMARY OF THE INVENTION

In view of the above, the primary objective of the present invention is to provide a wide angle lens, of which the total length is short, and the FOV can be more than 140 degrees.

The present invention provides a wide angle lens, which includes, from an object side to an image side along an optical axis, a first lens with negative refractive power, a second lens with negative refractive power, a third lens with positive refractive power, a fourth lens with positive refractive power, a fifth lens with negative refractive power, and a sixth lens with positive refractive power, wherein the sixth lens are adhered to the fifth lens to form a doublet lens. The wide angle lens further satisfies the following condition: SD2/R2>0.6; where SD2 is half of an effective aperture of a surface of the first lens which faces the image side; R2 is a radius of curvature of the surface of the first lens which faces the image side.

The present invention further provides a wide angle lens, which includes, from an object side to an image side along an optical axis, a first lens with negative refractive power, a second lens with negative refractive power, a third lens with positive refractive power, a fourth lens with positive refractive power, a fifth lens with negative refractive power, and a sixth lens with positive refractive power, wherein the sixth lens are adhered to the fifth lens to form a doublet lens. The wide angle lens further satisfies the following condition: EFL×(FOV/360)×π>3; where EFL is an effective focal length of the wide angle lens; FOV is a field of view of the wide angle lens.

With the aforementioned arrangement and optical conditions, the present invention can provide a FOV greater than 140 degrees, and is compatible with a large-sized photosensitive component of 1/2.3". In addition, the number of lenses in the wide angle lens is limited to 6, which helps to keep the wide angle lens miniaturized and lightweight. Furthermore, the aberration from visible light to infrared light can be corrected to generate high resolution images, and the wide angle lens of the present invention can be easily manufactured and assembled.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
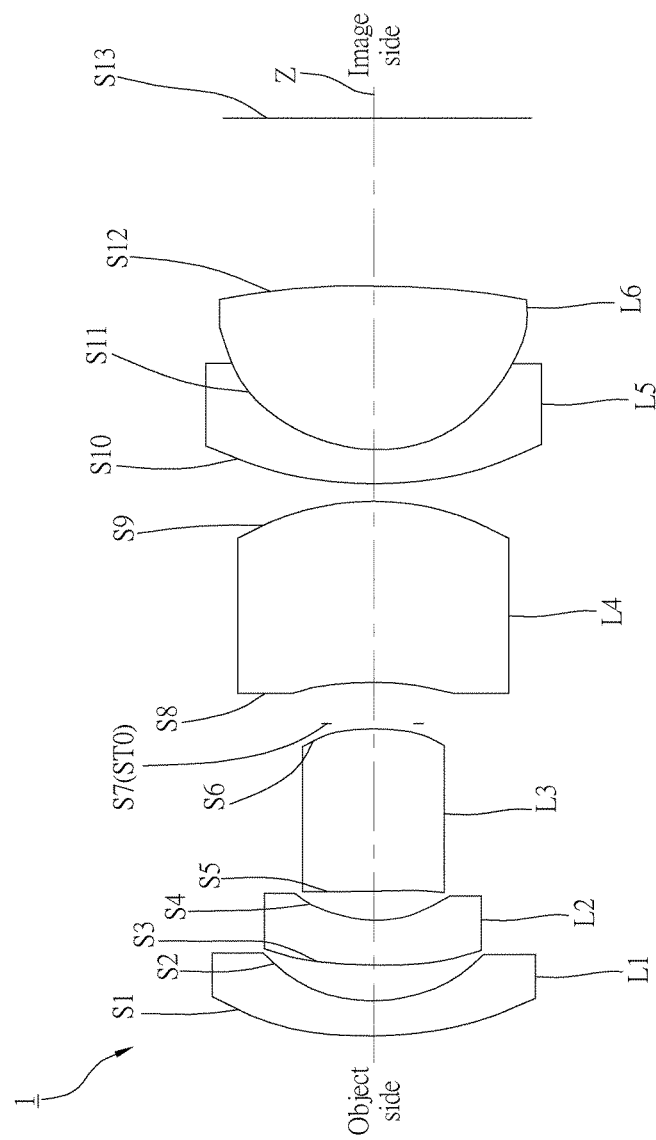
FIG. 1 is a schematic diagram of a first preferred embodiment of the present invention.
Figure 2:
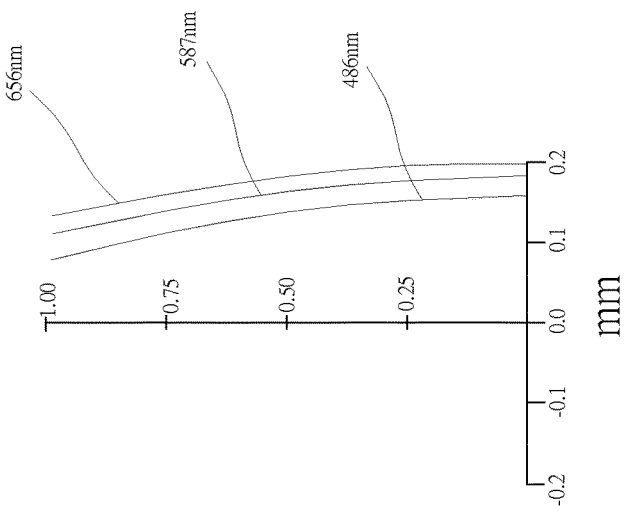
FIG. 2 is a diagram showing the longitudinal spherical aberration of the first preferred embodiment of the present invention.

A wide angle lens 1 of the first preferred embodiment on the present invention is illustrated in FIG. 1, and a wide angle lens 2 of the second preferred embodiment of the present invention is illustrated in FIG. 2.

The aforementioned wide angle lenses 1, 2 both have a first lens L1, a second lens L2, a third lens L3, a fourth lens L4, a fifth lens L5, and a sixth lens L6, which are arranged in order from an object side to an image side along an optical axis. In addition, to meet different requirements, an aperture STO is provided between the third lens L3 and the fourth lens L4, which reduces the stray light going into the wide angle lenses 1, 2, and therefore enhances the image quality.

The first lens L1 and the second lens L2 of the first preferred embodiment and the second preferred embodiment are meniscus lenses with negative refractive power, wherein convex surfaces S1, S3 of the first lens L1 and the second lens L2 face the object side. As a result, the FOV of the wide angle lenses 1, 2 can be broadened.

The third lens L3 of the first preferred embodiment is a meniscus lens with positive refractive power, wherein a concave surface S5 thereof is aspherical, and faces the object side; a convex surface S6 thereof is aspherical as well, and faces the image side. In the second preferred embodiment, the third lens L3 is a biconvex lens with positive refractive power, wherein a convex surface S5 thereof is aspherical, and faces the object side; a convex surface S6 thereof is aspherical, and faces the image side. The fourth lens L4 of the first preferred embodiment and the second preferred embodiment is a meniscus lens with positive refractive power, wherein a concave surface S8 thereof faces the object side; a convex surface S9 thereof faces the image side. The combination of the third lens L3 and the fourth lens L4 can effectively eliminate spherical aberration, coma aberration, and astigmatism. In other preferred embodiments, in addition to the aspherical third lens L3, at least one surface of the concave surface S8 and the convex surface S9 of the fourth lens L4 can be aspherical as well, which also helps to eliminate spherical aberration, coma aberration, and astigmatism.

The fifth lens L5 of the first preferred embodiment and the second preferred embodiment is a meniscus lens with negative refractive power, wherein a convex surface S10 thereof faces the object side, and a concave surface S11 thereof faces the image side. The sixth lens L6 is a biconvex lens with positive refractive power. The fifth lens L5 and the sixth lens L6 are adhered together to form a doublet lens with positive refractive power. With the doublet lens formed by the fifth lens L5 and the sixth lens L6, the axial chromatic aberration and lateral color can be effectively eliminated.

In addition, the wide angle lenses 1, 2 of the first and the second preferred embodiments further satisfy the following conditions:

(1) SD2/R2>0.6;

(2) EFL×(FOV/360)×π>3; and (3) the Abbe number of the fourth lens L4 is greater than 71.

In condition (1), SD2 is half of the effective aperture of the surfaces of the first lens L1 which face the image side, and R2 is the radius of curvature of the surfaces of the first lens L1 which face the image side. In condition (2), EFL is the effective focal length of the wide angle lenses 1, 2, and FOV is the FOV of the wide angle lenses 1, 2.

By satisfying the aforementioned conditions, the wide angle lenses 1, 2 of the first and the second preferred embodiments can provide better image quality, larger FOV, and are compatible with a large-sized photosensitive component. In more details, by satisfying the aforementioned condition (1), the FOV of the wide angle lenses 1, 2 can be effectively increased; by satisfying the aforementioned condition (2), the wide angle lenses 1, 2 can be compatible with a large-sized photosensitive component, and meet the requirement of high resolution; by satisfying the aforementioned condition (3), the wide angle lenses 1 can effectively eliminate the chromatic aberration.

The following Table 1 and Table two respectively show the effective focal length (EFL), a F number (Fno) of the aperture, the FOV, a radius of curvature (R) of each lens surface at where the optical axis Z passes through, a distance (D) between each surface and the next surface on the optical axis Z, a refractive index (Nd) of each lens, an Abbe number (Vd) of each lens, and half of the effective aperture of the wide angle lenses 1, 2 of the first and the second preferred embodiments.

TABLE 1

EFL = 3.115 mm; Fno = 2.7; FOV = 149°

| Surface | R (mm) | D (mm) | Nd | Vd | Half of the Effective Aperture (mm) | Note |
|---|---|---|---|---|---|---|
| S1 | 10.39104835 | 0.8919 | 1.905597 | 27.8752 | 4.4487 | First lens |
| S2 | 4 | 0.9842 | | | 3.0127 | L1 |
| S3 | 11.86500641 | 1.2117 | 1.904206 | 29.0087 | 3.0090 | Second |
| S4 | 3.455364239 | 0.7999 | | | 2.0726 | lens L2 |
| S5 | −64.78528191 | 4.3497 | 1.873172 | 26.4731 | 2.0824 | Third |
| S6 | −4.642569733 | 0.1404 | | | 1.6079 | lens L3 |
| S7 | ∞ | 1.0960 | | | 1.2827 | Aperture STO |
| S8 | −9.779782215 | 4.8803 | 1.812013 | 74.8819 | 1.7519 | Fourth |
| S9 | −7.171801327 | 0.5142 | | | 3.2381 | lens L4 |
| S10 | 10.63367142 | 0.9086 | 1.92286 | 24.8969 | 3.6842 | Fifth lens L5 |
| S11 | 4.233148229 | 4.3898 | 1.74628 | 63.8613 | 3.5429 | Sixth |
| S12 | −24.74072586 | 4.5494 | | | 3.7296 | lens L6 |
| S13 | ∞ | | | | 3.9666 | Imaging plane S13 |

TABLE 2

EFL = 3.623 mm; Fno = 2.7; FOV = 149°

| Surface | R (mm) | D (mm) | Nd | Vd | Half of the Effective Aperture (mm) | Note |
|---|---|---|---|---|---|---|
| S1 | 65.994 | 0.800 | 1.770652 | 49.6825 | 5.515 | First lens |
| S2 | 4.000 | 3.539 | | | 3.519 | L1 |
| S3 | 5.626 | 2.716 | 1.772499 | 49.5984 | 2.963 | Second |
| S4 | 3.878 | 0.781 | | | 1.998 | lens L2 |
| S5 | 30.784 | 1.825 | 1.509908 | 68.9968 | 1.913 | Third lens |
| S6 | −5.515 | 0.100 | | | 1.542 | L3 |
| S7 | ∞ | 0.915 | | | 1.389 | Aperture STO |
| S8 | −11.008 | 2.598 | 1.496928 | 72.4257 | 1.859 | Fourth |
| S9 | −3.680 | 3.086 | | | 2.612 | lens L4 |
| S10 | 10.274 | 0.800 | 1.899603 | 19.3453 | 3.728 | Fifth lens L5 |
| S11 | 4.610 | 3.075 | 1.748955 | 50.7253 | 3.598 | Sixth lens |
| S12 | 237.648 | 4.266 | | | 3.636 | L6 |
| S13 | ∞ | | | | 3.913 | Imaging plane S13 |

In addition, the surface concavity z of each of the aspheric surfaces S5 and S6 of the third lens L3 in the first and the second preferred embodiments is defined by the following formula:

$$z = \frac{ch^2}{1 + \sqrt{1 - (1+k)c^2h^2}} + Ah^4 + Bh^6 + Ch^8 + Dh^{10} + Eh^{12} + Fh^{14} + Gh^{16} + Hh^{18} + Jh^{20}$$

where:

z is the surface concavity;

c is the reciprocal of the radius of curvature;

h is half the off-axis height of the surface;
k is the conic constant; and
A-J respectively represents different order coefficient of h.

The conic constant k of each of the aspheric surfaces S5, S6 and each order coefficient A-I of the wide angle lenses 1, 2 of the first and the second preferred embodiments of the present invention are respectively listed in the following Tables 3-4.

TABLE 3

| Conic constant | Aspheric surface | |
| --- | --- | --- |
| | S5 | S6 |
| k | 0 | 0 |
| A | −0.002404423 | 5.16E−05 |
| B | −0.000550694 | −4.15E−05 |
| C | −6.08E−05 | −3.75E−06 |
| D | 1.08E−05 | 2.43E−06 |
| E | −3.51E−20 | −2.47E−21 |
| F | −2.20E−23 | −1.74E−23 |
| G | −1.12E−25 | −1.17E−25 |
| H | 0 | 0 |
| I | 0 | 0 |

TABLE 4

| Conic constant | Aspheric surface | |
| --- | --- | --- |
| | S5 | S6 |
| k | 0 | 0 |
| A | 0.000579212 | 0.004035 |
| B | 0.000475295 | 0.000509 |
| C | 4.50E−05 | 2.00E−05 |
| D | 9.38E−06 | 1.67E−05 |
| E | −7.29E−18 | −7.31E−18 |
| F | −5.76E−20 | −5.77E−20 |
| G | −4.55E−22 | −4.55E−22 |
| H | 0 | 0 |
| I | 0 | 0 |

It can be seen from Table 1 that, the wide angle lens 1 of the first preferred embodiment satisfies the aforementioned conditions (1) to (3), wherein SD2/R2 of the wide angle lens 1 is 0.753, which satisfies the condition (1), i.e., SD2/R2>0.6; EFL×(FOV/360)×π of the wide angle lens 1 is 4.05, which satisfies the condition (2), i.e., EFL×(FOV/360)×π>3; as for the condition (3), it has been shown in Table 1.

Figure 3:
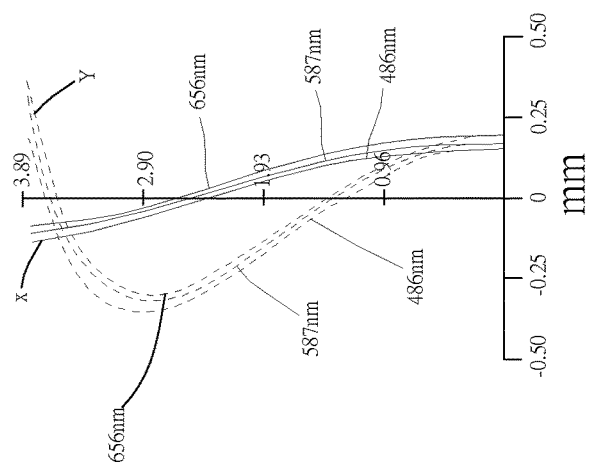
FIG. 3 is a diagram showing the field curvature of the first preferred embodiment of the present invention.
Figure 4:
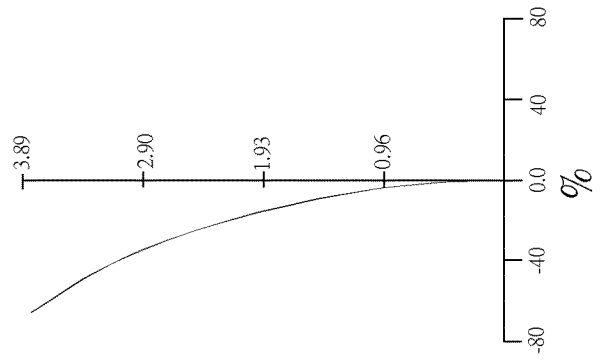
FIG. 4 is a diagram showing the distortion of the first preferred embodiment of the present invention.
Figure 5:
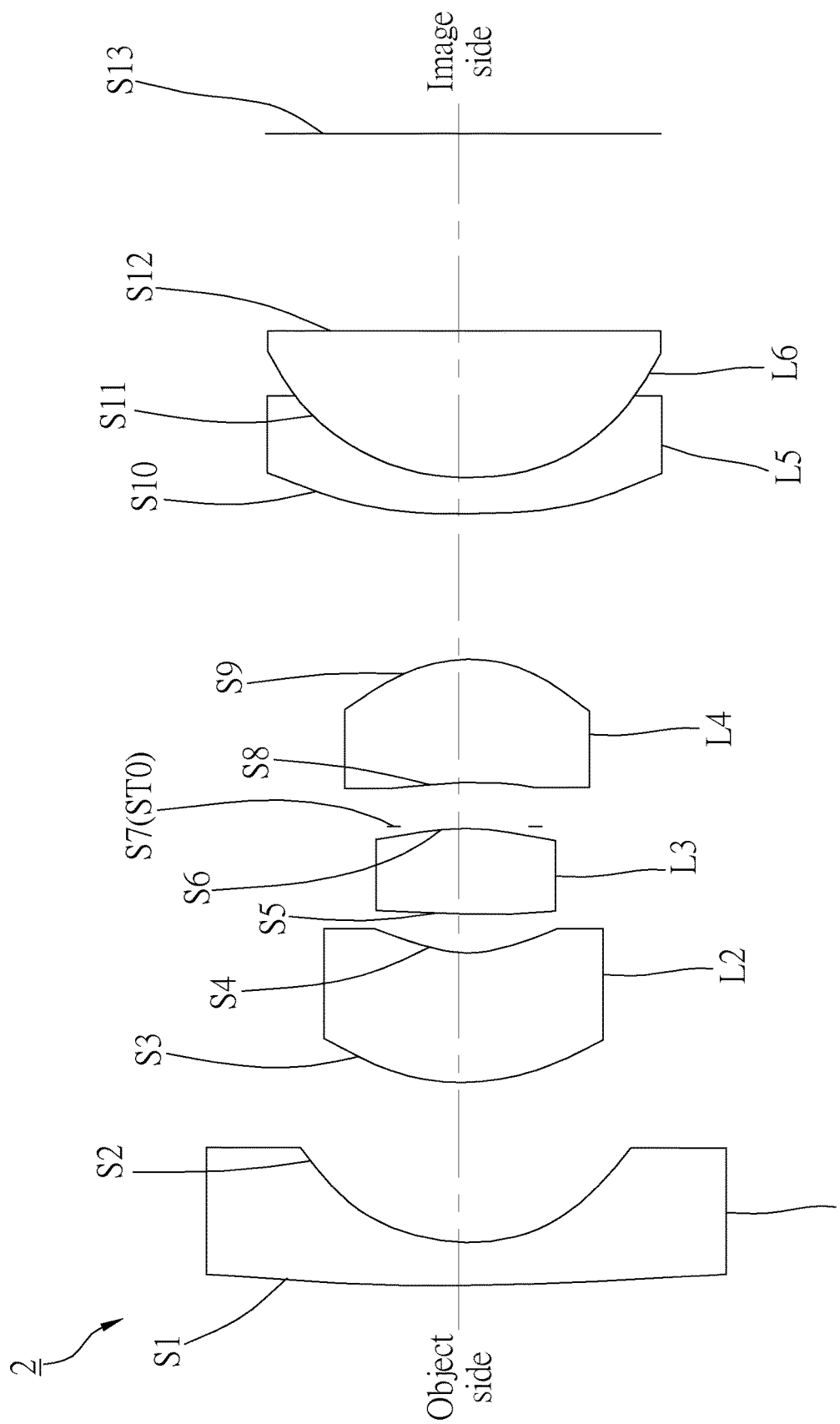
FIG. 5 is a schematic diagram of a second preferred embodiment of the present invention.

As a result, as shown in FIG. 2 to FIG. 4, with the aforementioned arrangement of the lenses L1-L6 and the aperture STO, the wide angle lens 1 of the first preferred embodiment can meet the requirement for high image quality, wherein FIG. 2 shows that the longitudinal spherical aberration of the wide angle lens 1 does not exceed 0.2 mm; FIG. 3 shows that the maximum field curvature thereof does not exceed 0.5 mm and −0.5 mm; FIG. 4 shows that the distortion thereof does not exceed −80%.

It can be seen from Table 2 that, the wide angle lens 2 of the second preferred embodiment satisfies the aforementioned conditions (1) to (3), wherein SD2/R2 of the wide angle lens 2 is 0.88, which satisfies the condition (1), i.e., SD2/R2>0.6; EFL×(FOV/360)×π of the wide angle lens 2 is 4.71, which satisfies the condition (2), i.e., EFL×(FOV/360)×π>3; as for the condition (3), it has been shown in Table 2.

Figure 6:
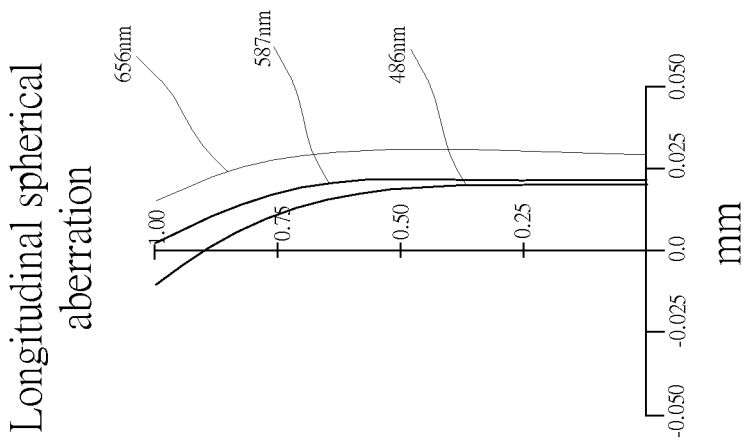
FIG. 6 is a diagram showing the longitudinal spherical aberration of the second preferred embodiment of the present invention.
Figure 7:
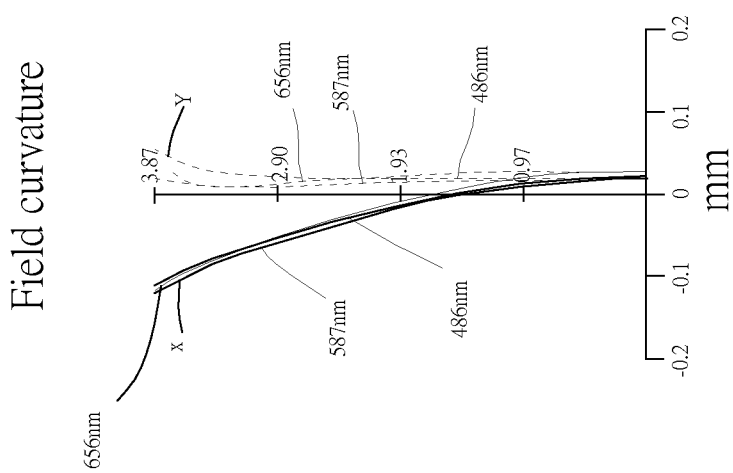
FIG. 7 is a diagram showing the field curvature of the second preferred embodiment of the present invention.
Figure 8:
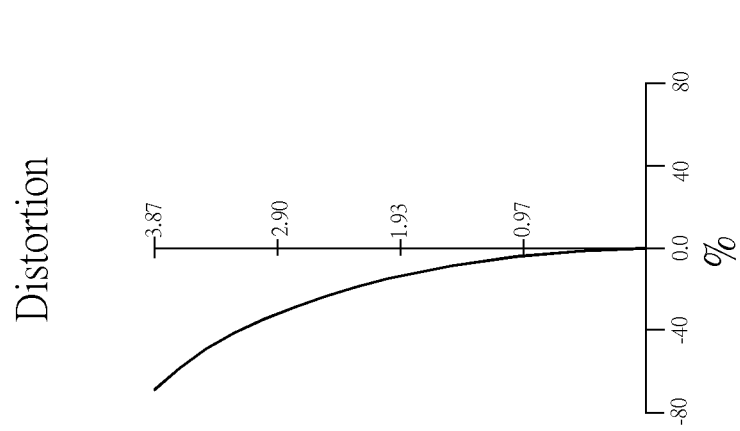
FIG. 8 is a diagram showing the distortion of the second preferred embodiment of the present invention.

As a result, as shown in FIG. 6 to FIG. 8, with the aforementioned arrangement of the lenses L1-L6 and the aperture STO, the wide angle lens 2 of the second preferred embodiment can meet the requirement for high image quality, wherein FIG. 6 shows that the longitudinal spherical aberration of the wide angle lens 2 does not exceed 0.375 mm; FIG. 7 shows that the maximum field curvature thereof does not exceed 0.1 mm and −0.15 mm; FIG. 8 shows that the distortion thereof does not exceed −80%.

In summary, with the aforementioned arrangement and optical conditions, the wide angle lenses 1, 2 of the present invention can provide a FOV greater than 140 degrees, and are both compatible with a large-sized photosensitive component of 1/2.3". In addition, the number of lenses in each of the wide angle lenses 1, 2 is limited to 6, which helps to keep each of the wide angle lenses 1, 2 miniaturized and lightweight. Furthermore, the aberration from visible light to infrared light can be corrected to generate high resolution images, and the wide angle lenses 1, 2 of the present invention can be easily manufactured and assembled.

It must be pointed out that the embodiments described above are only some preferred embodiments of the present invention. All equivalent structures which employ the concepts disclosed in this specification and the appended claims should fall within the scope of the present invention.

What is claimed is:

1. A wide angle lens, in order from an object side to an image side along an optical axis, comprising:
   a first lens with negative refractive power;
   a second lens with negative refractive power;
   a third lens with positive refractive power;
   a fourth lens with positive refractive power;
   a fifth lens with negative refractive power; and
   a sixth lens with positive refractive power, wherein the sixth lens are adhered to the fifth lens to form a doublet lens;
   wherein the wide angle lens further satisfies the following condition:

$$SD2/R2>0.6;$$

where SD2 is half of an effective aperture of a surface of the first lens which faces the image side; R2 is a radius of curvature of the surface of the first lens which faces the image side.

2. The wide angle lens of claim 1, wherein the wide angle lens further satisfies the following condition:

$$EFL\times(FOV/360)\times\pi>3;$$

where EFL is an effective focal length of the wide angle lens; FOV is a field of view of the wide angle lens.

3. The wide angle lens of claim 1, wherein an Abbe number of the fourth lens is greater than 71.

4. The wide angle lens of claim 1, wherein at least one lens of the third lens and the fourth lens has at least one aspherical surface.

5. The wide angle lens of claim 1, wherein the doublet lens has positive refractive power.

6. The wide angle lens of claim 1, further comprising an aperture, which is located between the third lens and the fourth lens.

7. A wide angle lens, in order from an object side to an image side along an optical axis, comprising:
   a first lens with negative refractive power;
   a second lens with negative refractive power;
   a third lens with positive refractive power;
   a fourth lens with positive refractive power;
   a fifth lens with negative refractive power; and
   a sixth lens with positive refractive power, wherein the sixth lens are adhered to the fifth lens to form a doublet lens;

wherein the wide angle lens further satisfies the following condition:

$$EFL \times (FOV/360) \times \pi > 3;$$

where EFL is an effective focal length of the wide angle lens; FOV is a field of view of the wide angle lens.

8. The wide angle lens of claim 7, wherein an Abbe number of the fourth lens is greater than 71.

9. The wide angle lens of claim 7, wherein at least one lens of the third lens and the fourth lens has at least one aspherical surface.

10. The wide angle lens of claim 7, wherein the doublet lens has positive refractive power.

11. The wide angle lens of claim 7, further comprising an aperture, which is located between the third lens and the fourth lens.

* * * * *